US012717453B1

(12) United States Patent
Sturm et al.

(10) Patent No.: US 12,717,453 B1
(45) Date of Patent: Aug. 25, 2026

(54) ELECTRODE OF A CAPACITANCE MODULE

(71) Applicant: Cirque Corporation, Sandy, UT (US)

(72) Inventors: Ethan Sturm, Salt Lake City, UT (US); Brian Monson, Farmington, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 19/225,673

(22) Filed: Jun. 2, 2025

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01); *G06F 2203/04107* (2013.01)

(58) Field of Classification Search
CPC ................. G06F 3/0446; G06F 3/0416; G06F 2203/04107
See application file for complete search history.

(56) References Cited

U.S. PATENT DOCUMENTS

| | | | | |
|---|---|---|---|---|
| 8,547,116 | B2 | 10/2013 | Togura | |
| 9,910,531 | B2 | 3/2018 | Han | |
| 11,003,279 | B2 | 5/2021 | Monson | |
| 2023/0236668 | A1 * | 7/2023 | Glad | G06F 3/016 345/174 |

* cited by examiner

*Primary Examiner* — Lisa S Landis

(57) ABSTRACT

An electronic device may include a display surface, the display surface having an input region that is located proximate to an edge of the display surface, a transverse substrate that is transversely oriented with respect to the display surface, a capacitance electrode disposed on the transverse substrate, where the capacitance electrode is disposed between a non-electrode shield and the display surface, a controller connected to the capacitance electrode, and memory in communication with the controller. The memory may include programmed instructions which cause the controller, when executed, to determine a user input in the input region in response to a signal from the capacitance electrode.

20 Claims, 13 Drawing Sheets

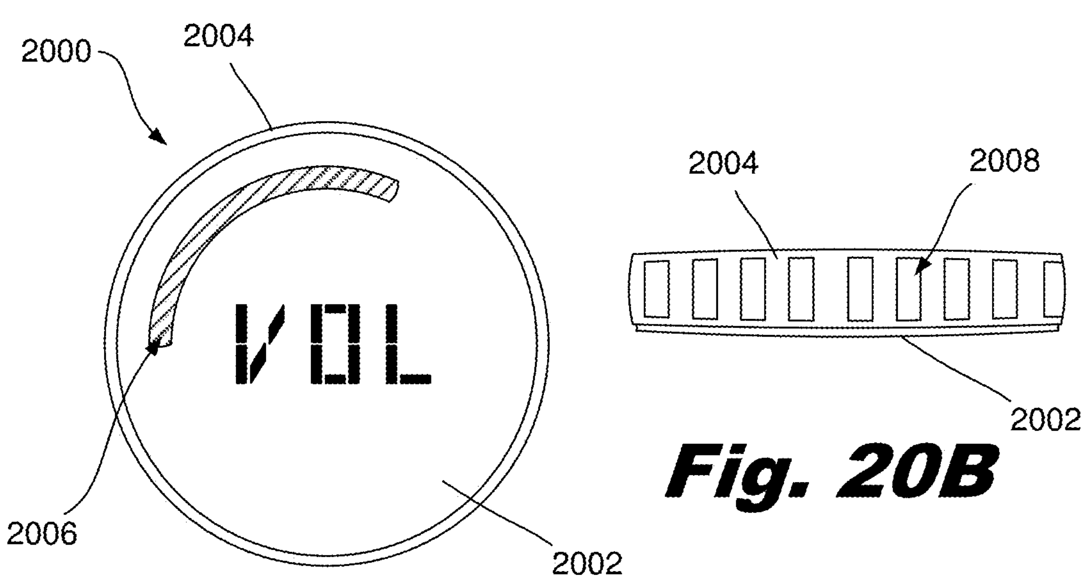
Fig. 20B
Fig. 20A
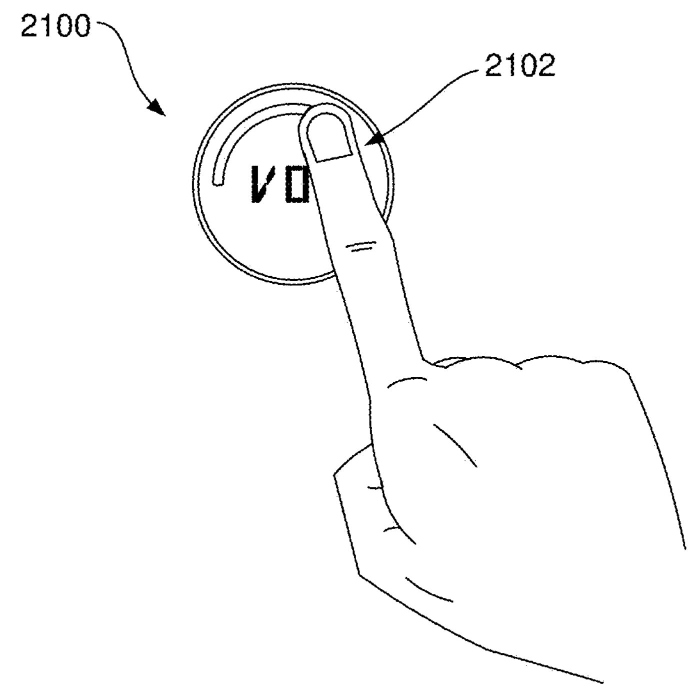
Fig. 21

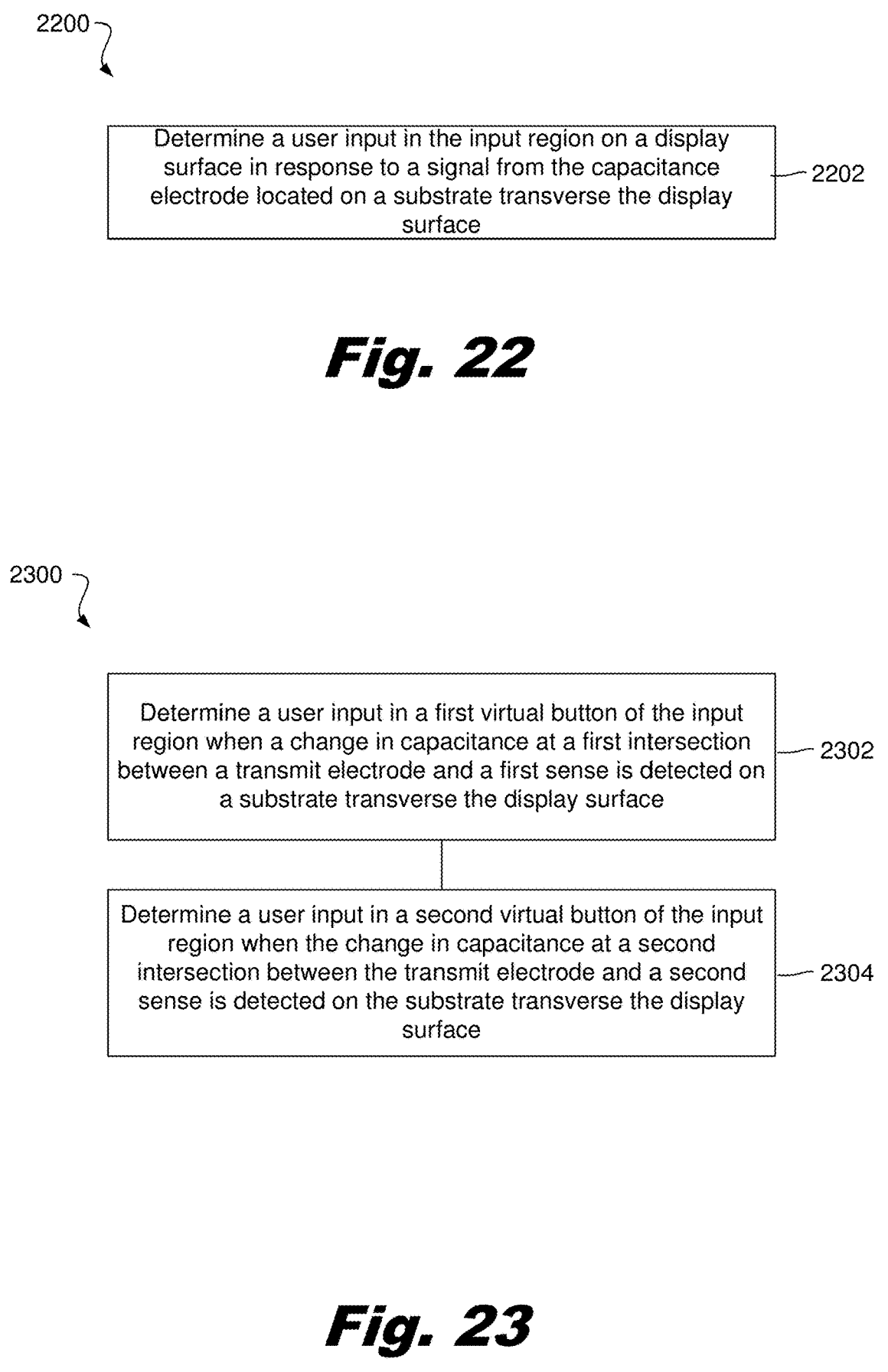

2200

Determine a user input in the input region on a display surface in response to a signal from the capacitance electrode located on a substrate transverse the display surface — 2202

Determine a user input in a first virtual button of the input region when a change in capacitance at a first intersection between a transmit electrode and a first sense is detected on a substrate transverse the display surface — 2302

Determine a user input in a second virtual button of the input region when the change in capacitance at a second intersection between the transmit electrode and a second sense is detected on the substrate transverse the display surface — 2304

Fig. 23

ELECTRODE OF A CAPACITANCE MODULE

FIELD OF THE DISCLOSURE

This disclosure relates generally to systems and methods for capacitive sensing systems and input devices. In particular, this disclosure relates to systems and methods for capacitive sensing using electrodes for touch or proximity detection.

BACKGROUND

Some electronic devices, such as home thermostats, smart home panels, kitchen appliances, and other consumer electronics increasingly rely on capacitive touch input to deliver modem user experiences.

An example of a touch sensor with peripheral electrodes is disclosed in U.S. Pat. No. 11,003,279 issued to Brian Monson, et al. This reference discloses an apparatus which may include a touch sensor, a touch region of the touch sensor that is free of sense electrodes, a first peripheral region of the touch sensor and a second peripheral region of the touch sensor and the touch region is located between the first peripheral region and the second peripheral region, a first sense electrode is located in the first peripheral region, a second sense electrode is located in the second peripheral region.

An example of a capacitive touch sensor is disclosed in U.S. Pat. No. 8,547,116 issued to Takeshi Togura, et al. This reference discloses a position detector to enable position or distance of sensing target making approach, etc. to the range of sensing area to be detected securely with simple configuration at low cost and improve latitude of designing, position detector includes capacitance sensor unit and detecting circuit unit. Capacitance sensor unit includes first and second sensing electrodes and dielectric material therebetween. Dielectric material has range L of sensing area defined on its sensing surface. Detecting circuit unit includes selector switches SWA and SWB, capacitance sensing circuits, A/D converters, and arithmetic processing circuit. Arithmetic processing circuit judges and detects the position of sensing target in range L of sensing area based on detected values of capacitances C1 and C2 sensed by first and second sensing electrodes under switching control on selector switches SWA and SWB.

An example of a single layer electrode pattern is disclosed in U.S. Pat. No. 9,910,531 issued to Sang Chul Han, et al. This reference discloses a circular, single-layer sensor electrode pattern for input devices, such as wearable devices. The sensor electrode pattern features transmitter electrodes and receiver electrodes tiled in alternating fashion, such that each receiver electrode is surrounded by transmitter electrodes. The individual sensor electrodes of the described pattern are designed to provide a substantially uniform electrode area size across the sensor. Additionally, the sensor electrode pattern is arranged to be symmetric across both horizontal and vertical axes. The provided characteristics of the sensor electrode pattern leads to a sensor structure having uniform absolute capacitive sensing measurements for all sensor electrodes as well as uniform trans capacitive sensing measurements for all "pixels."

Each of these references are herein incorporated by reference for all that they disclose.

SUMMARY

In one embodiment, an electronic device may include a display surface, the display surface having an input region that is located proximate to an edge of the display surface, transverse substrate that is transversely oriented with respect to the display surface, a capacitance electrode disposed on the transverse substrate, where the capacitance electrode is disposed between a non-electrode shield and the display surface, a controller connected to the capacitance electrode, and memory in communication with the controller. The memory may include programmed instructions which cause the controller, when executed, to determine a user input in the input region in response to a signal from the capacitance electrode.

The display surface may be free of capacitance electrodes.

The capacitance electrode may be a sense electrode.

The electronic device may include a transmit electrode between the non-electrode shield and the display surface.

The transmit electrode and the sense electrode may form a mutual capacitance sensing circuit.

The programmed instructions may cause the transmit electrode to transmit an excitation signal having a different voltage from the voltage of the non-electrode shield.

The sense electrode may have a sensing range that extends from the non-electrode shield into a portion of the display surface.

The sensing range may extend to under a third of the length of the display surface.

The non-electrode shield may be electrically isolated from the controller.

The programmed instructions may further cause the processor, when executed, to adjust a value displayed in the display surface in response to determining a user input in the input region.

The electronic device may include a display module adjacent to the display surface.

The display module may include at least one pixel, and the capacitance electrode may be between the pixel and the non-electrode shield.

The display module may overlap at least a portion of the input region.

The display module and the input region may be spatially distinct.

The non-electrode shield may be grounded.

The non-electrode shield may be a floating element.

The transverse substrate may form an angle between 55 degrees and 125 degrees with the display surface.

The display surface may have a rectangular shape.

The display surface may have a circular shape.

The non-electrode shield may overlap the capacitance electrode and shield against sensing input on the transverse substrate.

An electronic device may include a display surface; the display surface having an input region that may be located proximate an edge of the display surface; a transverse substrate that may be transversely oriented with respect to the display surface; a transmit electrode and a first sense electrode disposed on the transverse substrate where the transmit electrode and the first sense electrode form a first intersection; a second sense electrode disposed on the transverse substrate where the transmit electrode and the second sense electrode form a second intersection where the transmit electrode, the first sense electrode, and the second sense electrode may be disposed between a non-electrode shield and the display surface; a controller connected to the capacitance transmit electrode, the first sense electrode, and the second sense electrode; memory in communication with the controller, the memory having programmed instructions which cause the controller, when executed to determine a user input in a first virtual button of the input region when a change in capacitance at the first intersection may be detected; and determine the user input in a second virtual button of the input region when a change in capacitance at the second intersection may be detected.

BRIEF DESCRIPTION OF THE DRAWINGS

FIG. 20A depicts an example of a front view of an electronic device in accordance with the disclosure.

FIG. 20B depicts an example of a side view of an electronic device in accordance with the disclosure.

FIG. 21 depicts an example of a user input in accordance with the disclosure.

FIG. 22 depicts an example of a method in accordance with the disclosure.

FIG. 23 depicts an example of a method in accordance with the disclosure.

Figure 1:
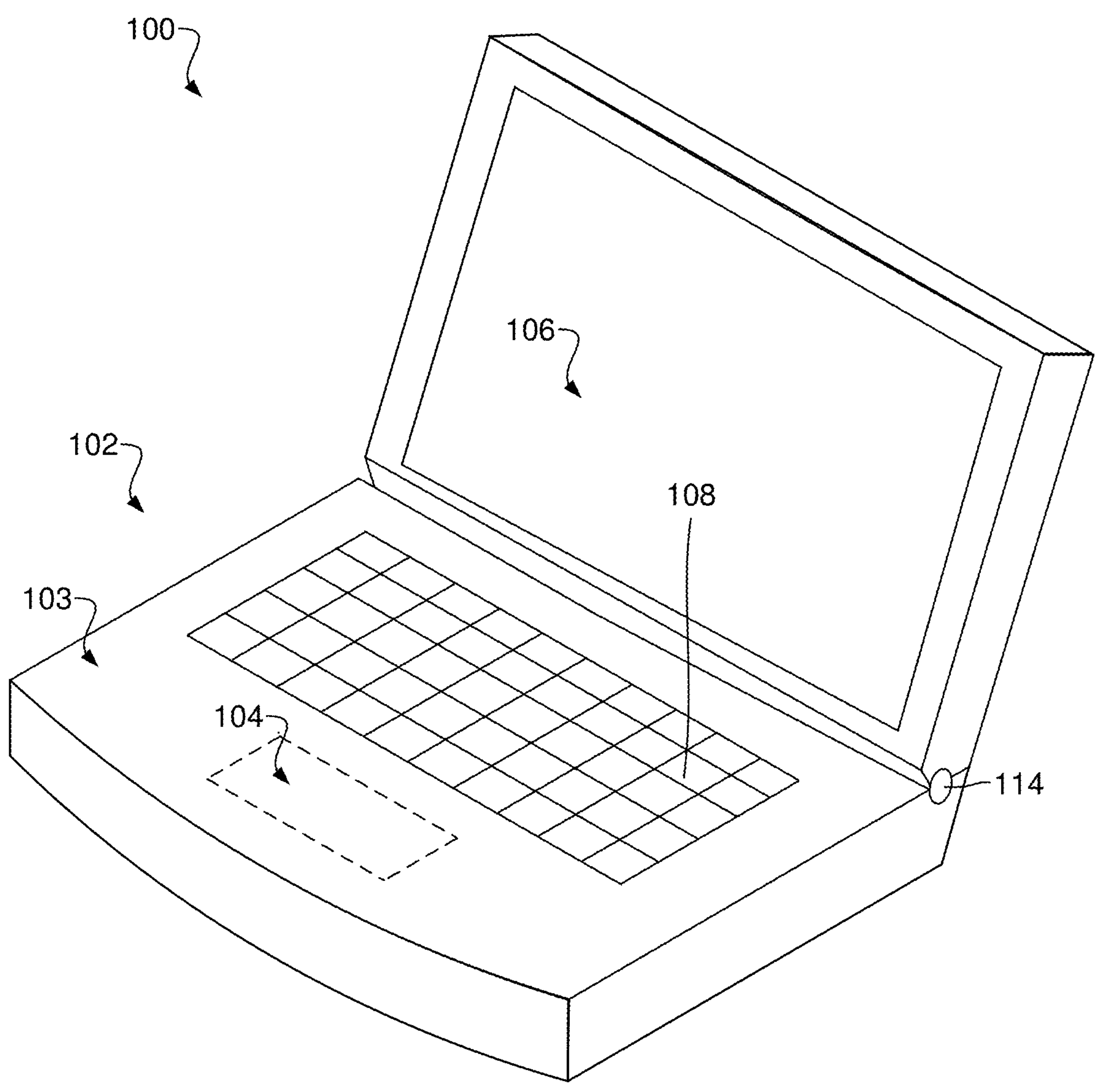
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term “aligned” generally refers to being parallel, substantially parallel, or forming an angle of less than 35.0 degrees. For purposes of this disclosure, the term “transverse” generally refers to perpendicular, substantially perpendicular, or forming an angle between 55.0 and 125.0 degrees. For purposes of this disclosure, the term “length” generally refers to the longest dimension of an object. For purposes of this disclosure, the term “width” generally refers to the dimension of an object from side to side and may refer to measuring across an object perpendicular to the object’s length.

For purposes of this disclosure, the term “electrode” may generally refer to a portion of an electrical conductor intended to be used to make a measurement, and the terms “route” and “trace” generally refer to portions of an electrical conductor that are not intended to make a measurement. For purposes of this disclosure in reference to circuits, the term “line” generally refers to the combination of an electrode and a “route” or “trace” portions of the electrical conductor. For purposes of this disclosure, the term “Tx” generally refers to a transmit line, electrode, or portions thereof, and the term “Rx” generally refers to a sense line, electrode, or portions thereof.

For the purposes of this disclosure, the term “electronic device” may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms “capacitance module,” “touch pad” and “touch sensor” throughout this document may be used interchangeably with “capacitive touch sensor,” “capacitive sensor,” “capacitance sensor,” “capacitive touch and proximity sensor,” “proximity sensor,” “touch and proximity sensor,” “touch panel,” “trackpad,” “touch pad,” and “touch screen.” The capacitance module may be incorporated into an electronic device.

It should also be understood that, as used herein, the terms “vertical,” “horizontal,” “lateral,” “upper,” “lower,” “left,” “right,” “inner,” “outer,” etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, a non-shield electrode may generally refer to an electrically conductive material that blocks, redirects, and/or isolates signals coming from a transmit electrode, a self-capacitance electrode, or combinations thereof. In some cases, the non-electrode shield may reduce noise from outside of the electronic device. In some cases, the non-shield electrode operates passively. In such instances, the non-electrode shield may not be connected to a power source, a controller, a data source, a signal line, a driver, or combinations thereof. In some cases, no signals are transmitted on the non-shield electrode, no capacitance measurements are measured with the non-electrode shield, or combinations thereof. The non-electrode shield may be electrically isolated from the transmit electrode, the sense electrode, a self-capacitance electrode, another type of electrode, or combinations thereof. In some examples, the non-electrode shield may include a fixed electrical potential by being grounded or fixed at a specific electrical potential. In some examples, the non-electrode shield is floating and may not be electrically connected to a variable power source.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
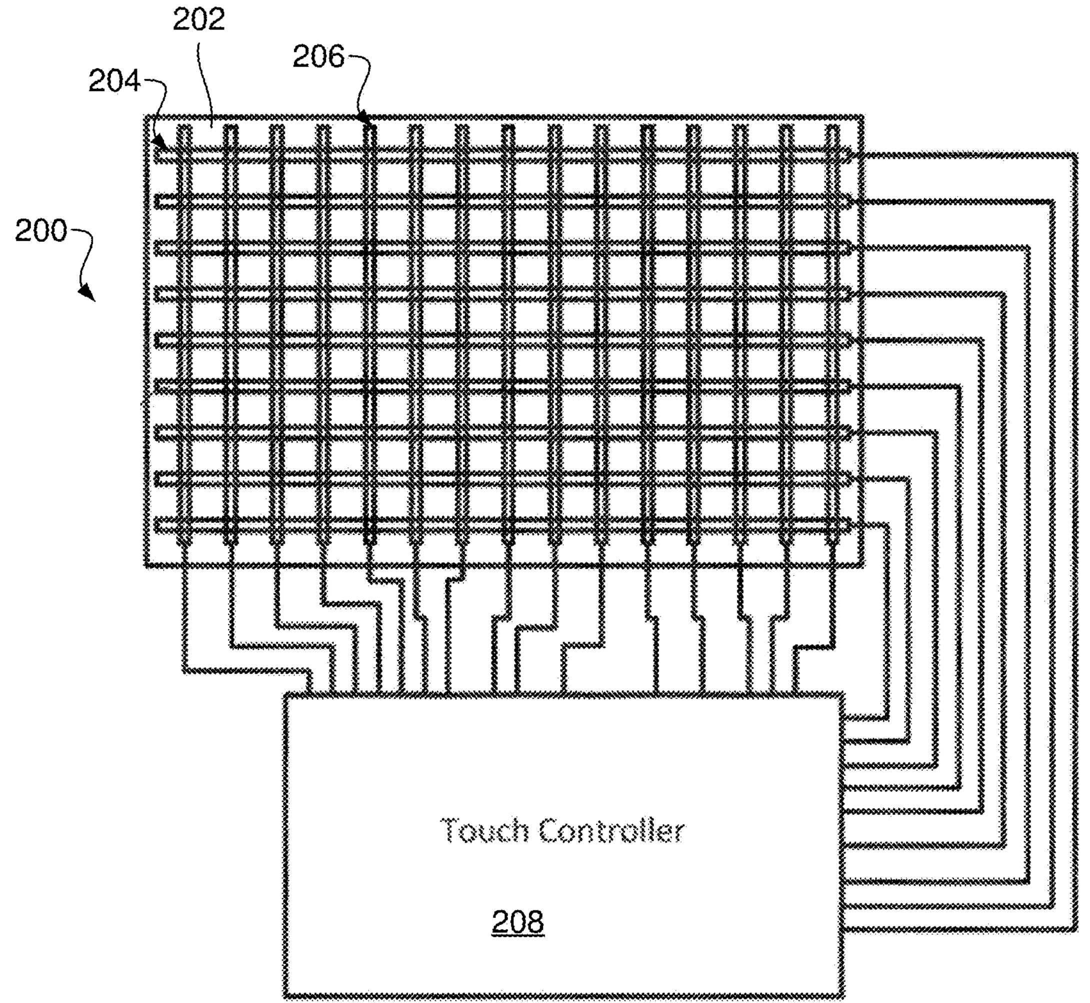
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
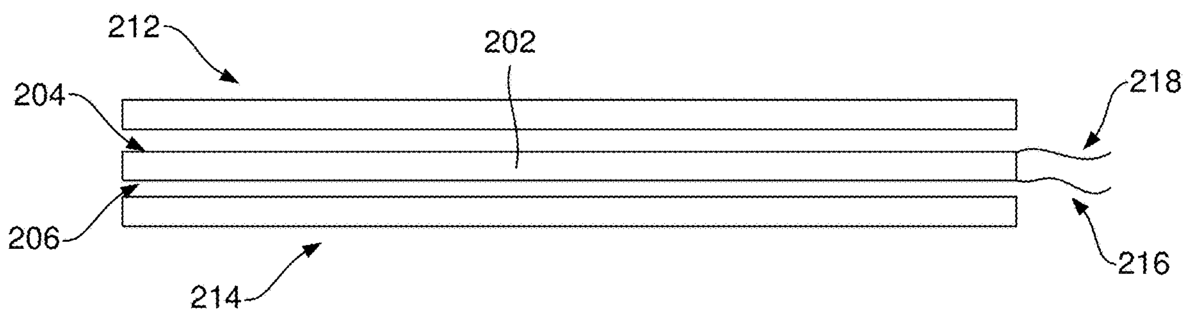
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
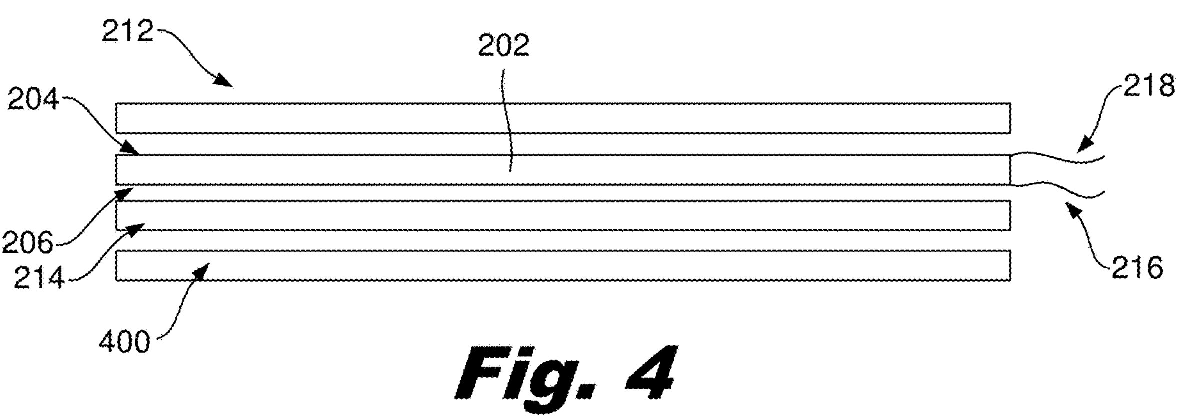
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
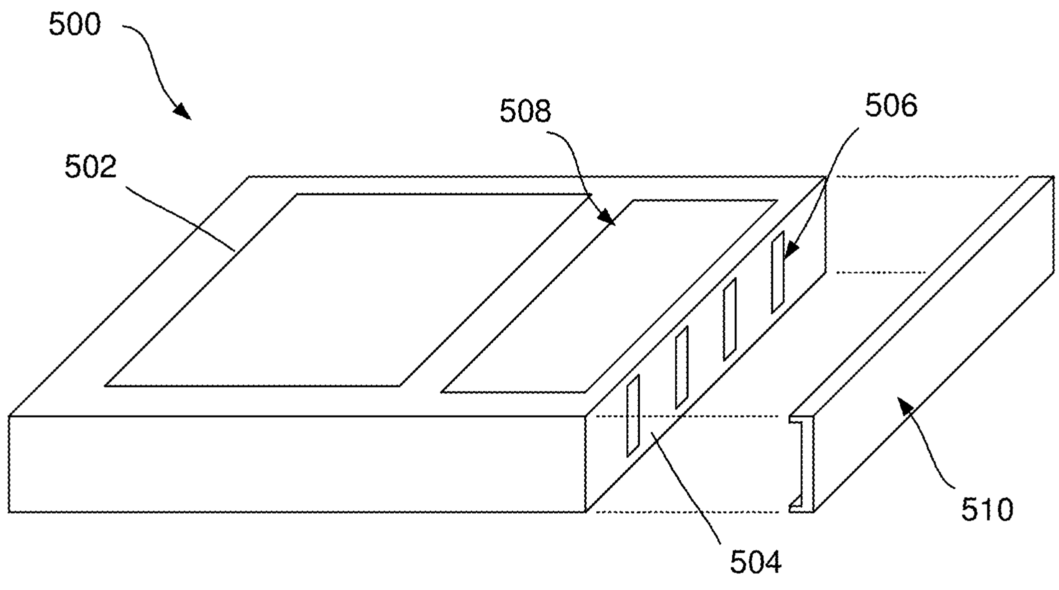
FIG. 5 depicts an example of an electronic device in accordance with the disclosure.

FIG. 5 depicts an example of an electronic device 500 in accordance with the disclosure. In this example, the electronic device 500 includes a display surface 502, a transverse substrate 504, multiple sense electrodes 506, an input region 508 disposed on the display surface, and a non-electrode shield 510. The display surface 502 and the transverse substrate 504 are transversely oriented with respect to each other. In some examples, the input region 508 is part of a display of the display surface 502 or the input region 508 is outside of the display.

As an input object, such as a user's finger or stylus, approaches the input region 508, the object may interfere with the electric fields of the sense electrodes 506, causing a change in the capacitance of the sense electrodes. This change in capacitance may be measured with a processor of the electronic device 500 to detect input on the input region 508.

In some examples, the non-electrode shield may be a peripheral shield, an annular shield, a side mounted shield, an asymmetric shield, or combinations thereof. The non-electrode shield may be incorporated into a single side of the electronic device or incorporated into more than one side of the electronic device.

In this example, the sense electrodes 506 may be four self-capacitance electrodes or mutual capacitance electrodes. In other examples, a different number of electrodes may be disposed on a transverse substrate, and the electrodes may be used in different sensing configurations. For example, a transverse substrate may include one electrode, two electrodes, or a different number of electrodes. The electrodes may be sense electrodes, transmit electrodes, another type of electrode, or combinations thereof. In some examples, electrodes on a transverse substrate may be configured to operate as self-capacitance sensors. In other examples, electrodes on a transverse substrate may form a mutual capacitance sensor.

The non-electrode shield 510 may be made of a material configured to reduce or block electromagnetic interference to the sense electrodes 506. To prevent accidental input from regions besides the input region 508, the non-electrode shield 510 is positioned adjacent the sense electrodes 506. The sensing region of the sense electrodes 506 may extend from the non-electrode shield 510 to the input region 508, extending through the material of the electronic device 500.

In some conventional electronic devices, sense electrodes are located on an adjacent layer to the display surface and overlap with the display surface. In this illustrated example, the electronic device 500 uses capacitance electrodes that are disposed on a surface that does not overlap with the display surface. In this example, the transverse substrate is transverse to the display surface, which includes the input region 508. Disposing electrodes on a separate surface that is transverse to an input region may have several advantages.

Disposing the sense electrodes 506 on a transverse substrate, such as the edge of a display or part of a housing may provide manufacturing flexibility. Rather than embedding the capacitance electrode structures adjacent the display surface, which may involve specialized manufacturing, lamination, or deposition steps, a side-mounted electrode configuration can be implemented with simpler fabrication techniques. Electrodes may be applied using standard PCB etching, adhesive-backed conductive film, printed electronics, or other manufacturing techniques, avoiding the need to alter the layers of the display stack.

This structural decoupling of the sensing electrodes from the input surface may allow for more modular construction approaches for electronic devices that incorporate capacitive input mechanisms. In some embodiments, electrode arrays with their own non-electrode shielding and connectors may be manufactured independently and attached to an electronic device's chassis during a later assembly step. This modularity may reduce the scrap rate in manufacturing, lower production costs, and simplify device maintenance or repair workflows.

Mounting the sense electrodes on a surface that is transverse the display surface may support retrofitting, enabling manufacturers to upgrade existing product lines by adding capacitive touch functionality without re-engineering the display or input surface itself. For example, an electronic device that originally include a non-touch display module may be converted to an electronic device that has an input region on the same surface as the display by attaching a transversely oriented electrode unit to the electronic device's side. This upgrade may be achieved with minimal disruption to the existing mechanical or electrical construction.

The separation of sense electrodes 506 and input region 508 may allow for improved isolation between the sensing system and other electrical components. This isolation may reduce interference, improve signal integrity, and allow more consistent capacitance measurements across different product configurations.

In some cases, a display module may include pixels and other components that are positioned adjacent to the display surface and configured to illuminate an image on the display surface. In conventional electronic devices, the capacitance electrodes are often positioned between such a display module and the display surface so that the capacitance electrodes are closer to the display surface where the user provides his or her input. However, by placing the capacitance electrodes between the display module and the display surface, the distance between the display module and the display surface increases, which may lower the quality of the display. By placing the capacitance electrodes to the side, the distance between the display module and the display surface is reduced and may increase the display quality.

In this example, the display surface 502 and the transverse substrate 504 are oriented transversely at approximately a right angle. In other examples, the angle between these surfaces may differ. The specific angle may affect the sensing range and resolution of the electrodes.

In this example, the input region 508 spans only a portion of the display surface 502. In other examples, the input region may span the entirety of the display surface, or it may be localized to a discrete section. The input region may also form part of a display module, such as an LCD panel, or may be functionally separate from the display system. In devices with multiple display modules, the input region may correspond to one of several individual modules. User input at the input region may trigger a change in the visual output of the display surface, such as adjusting a setting, navigating a menu, opening a program, playing a game, executing a transaction, moving a cursor, activating a feature, performing another action, or combinations thereof.

In this example, the electronic device 500 has a rectangular shape, and the display surface 502 is similarly rectangular. In other examples, the electronic device may have a circular or other non-rectangular shape. In some examples of electronic devices with circular display surfaces, electrodes may be disposed along the inner circumference or perimeter thickness of the circular housing. In such cases, the electrodes may be arranged in an arc or radial configuration to conform to the contour of the display surface.

This geometric flexibility may allow device manufacturers to implement touch interactivity in a wide range of electronic devices, including wearables, curved control panels, aesthetically refined consumer electronics, among other types of electronic devices. By decoupling electrode placement from the display surface, the display surface may maintain a clean, uninterrupted display area while still supporting capacitance input. Additionally, transverse electrode configurations may be well-suited for integrating touch controls into compact or curved enclosures without requiring intrusive sensor layers on the display surface.

Figure 6:
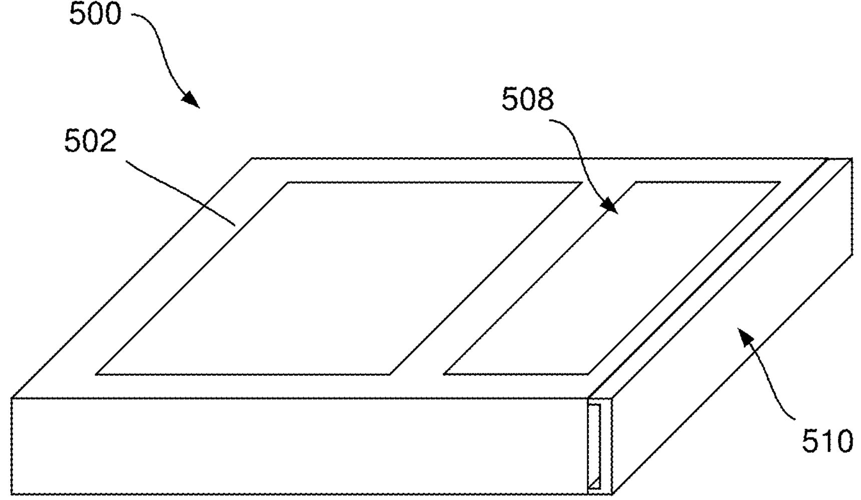
FIG. 6 depicts an example of an electronic device in accordance with the disclosure.

For illustrative purposes, FIG. 6 depicts the electronic device 500 with the peripheral non-electrode shield 510 enclosing the sense electrodes 506 along the transverse substrate 504. In this configuration, the sense electrodes are not visible from outside the electronic device. The non-electrode shield 510 physically protects and electrically isolates the capacitance electrodes from noise in the ambient environment from unintended touches that would otherwise occur as a user handles the electronic device or from other outside sources of electromagnetic interference. The non-electrode shield 510 may prevent other accidental input from outside the input region 508.

In some examples, the display surface and the transverse substrate are contiguous. In other examples, the display surface and the transverse substrate are not connected. The transverse substrate may be incorporated into the electronic device and subjacent to, adjacent to, next to, connected to, integrally formed with, or otherwise located with respect to the display surface.

Figure 7:
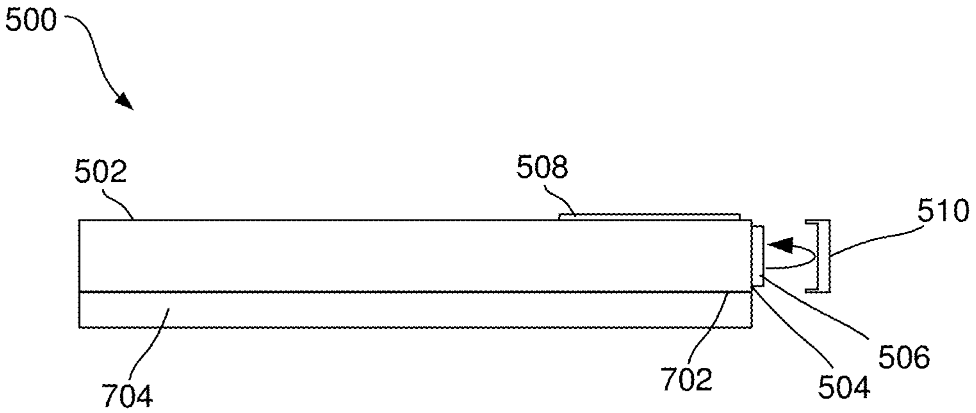
FIG. 7 depicts an example of an electronic device in accordance with the disclosure.

FIG. 7 depicts a cross-section view of the electronic device 500. The sense electrodes 506 are disposed on the transverse substrate 504, which is transverse to the display surface 502. A display module is located adjacent to the display surface, and the sense electrodes are positioned to the side of both the display surface and the display module, and not between the display surface and the display module. Each of the sense electrodes 506 may generate electric fields 702 which extends through the display surface to the input region 508. The non-electrode shield 510 is adjacent to the electrodes 506 and blocks the electric fields 702 from radiating away from the display surface, limiting the active sensing volume, and suppressing interference or false activations from objects approaching the device 500 from directions other than from the direction of the input region.

In some examples, a transmit electrode is disposed on the transverse substrate. In such an example, the transmit electrode may broadcast a signal in all directions. However, the non-electrode shield may reflect or otherwise redirect the transmit signal back towards the input region of the display surface and away from itself.

In some examples, the non-electrode shield may include at least one flange. In the illustrated example, the non-shield electrode includes a first flange 706 on a first side of the non-shield electrode that is aligned with the display surface, and a second flange 708 on a second side of the non-shield electrode that that is opposite the first flange. The flanges may further focus the transmit signal towards the input region of the display surface.

The sense electrode may also be connected to the transverse substrate or a layer near the transverse substrate. The non-electrode shield may direct the transmit signal away from the transverse substrate and away from the sense electrode. However, the sense electrode may have a sensing range that extends at least a distance in which the input region is occupied.

Figure 8:
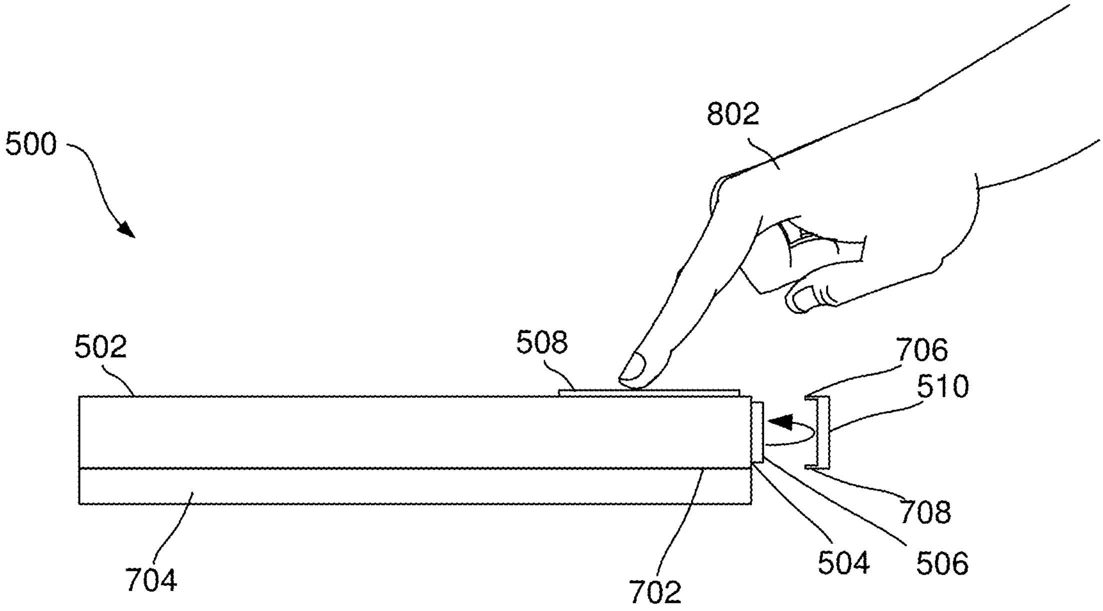
FIG. 8 depicts an example of a user input in accordance with the disclosure.

FIG. 8 illustrates the cross-section view of the electronic device 500 while a conductive input object 802 approaches or contacts the input region 508. In this case, the input object 802 is a user's finger. As the object 802 couples to and partially distorts the electric fields 702, a measurable change in the capacitance of the electrodes 506 is produced, which the electronic device 500 may interpret as input.

In some embodiments, the non-electrode shield 510 may be an electrically floating element, detached from a common ground reference compared to the other electrical elements of the device 500. A floating shield may passively redistribute charge, thereby attenuating external electromagnetic interference while still permitting the electric fields 702 to couple to the input region 508. In some examples, the shield 510 may be selectively shorted to ground during a calibration interval to further reduce common-mode noise or compensate for temperature drift without altering the electrode bias.

In other embodiments, the shield 510 may be actively driven with a voltage that is different from the voltage of the capacitance electrodes 506. The difference in voltage may be a difference in amplitude, phase, DC offset, or another waveform characteristic. For example, in a mutual capacitance configuration, a square wave signal may be applied to the transmit electrodes, and a square wave with a 90-degree phase difference may be applied to the shield 510. This biasing may constrain the fringing effects while also reducing capacitive coupling between the shield 510 and the electrodes 506.

In the illustrated example, the transmit signal is not applied to the non-electrode shield. The non-electrode shield may reduce interference on both the transmit electrode(s) and the sense electrode(s).

Providing a non-shield electrodes allows a user to touch or otherwise handle the electronic device's housing near the non-electrode shield without interfering with the transmit and/or sense signals.

Figure 9:
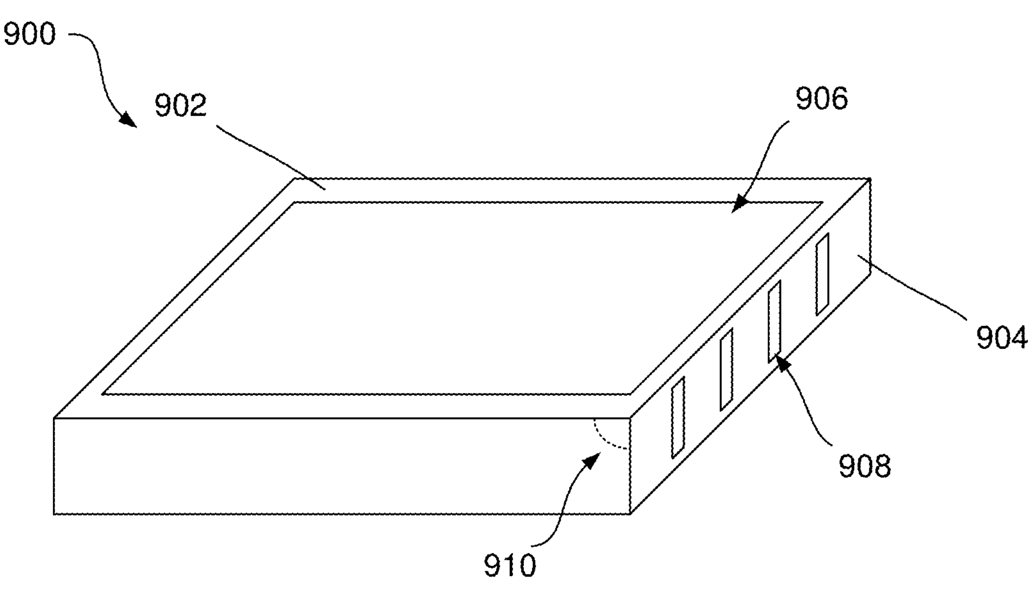
FIG. 9 depicts an example of an electronic device in accordance with the disclosure.

FIG. 9 depicts an example of an electronic device 900 with a display surface 902 and a transverse substrate 904. An input region 906 is defined on the display surface 902, and sense electrodes 908 are disposed on the transverse substrate 904. The display surface 902 and the transverse substrate 904 meet at a right angle 910.

This example illustrates how an input region 906 may define a substantial majority of a display surface 902. In other examples, an input region may define a smaller portion of the display surface.

In this example, the display surface 902 and the transverse substrate 904 meet at the 90-degree angle 910. In other examples, the angle between display surface 902 and the transverse substrate 904 may be a different number of degrees, such less than 55 degrees, less than 70 degrees, less than 85 degrees, more than 95 degrees, more than 110 degrees, more than 125 degrees, another range, or combinations thereof.

Figure 10:
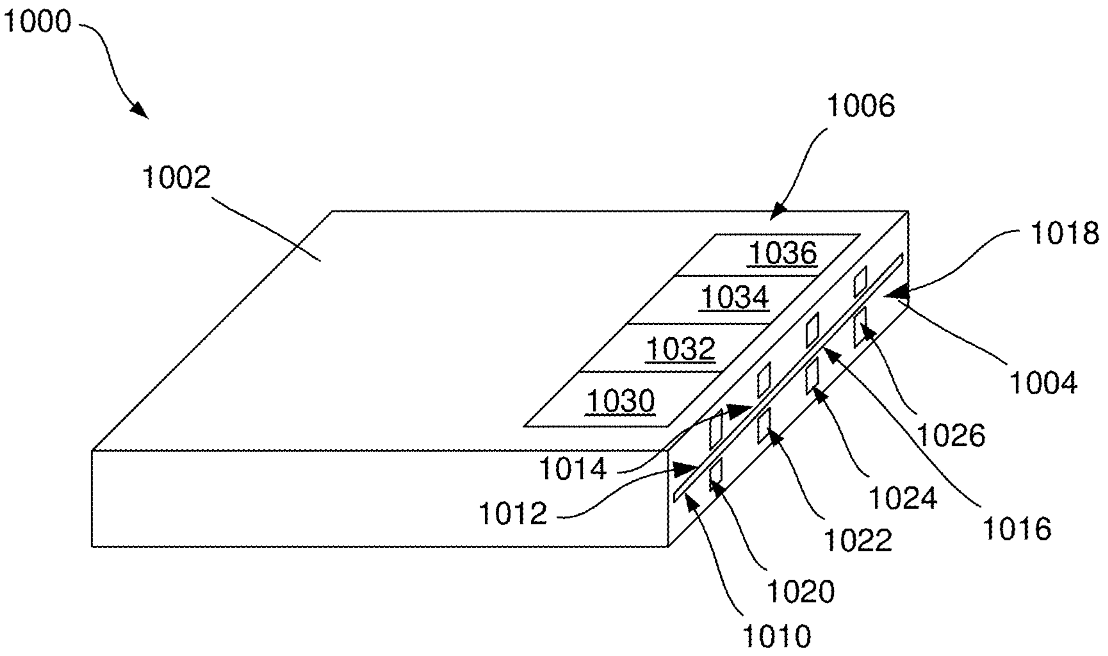
FIG. 10 depicts an example of an electronic device in accordance with the disclosure.

FIG. 10 depicts an electronic device 1000 with a mutual capacitance sensor formed by a transmit electrode 1010 and multiple sense electrodes 1020, 1022, 1024, 1026 on a transverse substrate 1004. The transverse substrate 1004 is transverse a display surface 1002, and the display surface includes an input region 1006. While the transmit electrode 1010 and the sense electrodes are depicted in a specific arrangement, the transmit electrodes and the sense electrodes may be arranged in any suitable arrangement to measure capacitance in the input region.

In this example, transmit electrode 1010 is on the transverse substrate 1004, and the length of the transmit electrode 1010 is aligned with the display surface 1002 and/or the input region 1006. At least one sense electrode is located on the transverse substrate 1004, and the length of the sense electrode is transverse to the display surface 1002 and/or the input region 1006. The sense electrode and the transmit electrode 1010 may be electrically isolated from one another. In one example, the electrically isolated sense electrode any form an intersection with the transmit electrode. Such interactions may align with the input region. The change in capacitance may be measured at the intersection of the transmit electrode and the sense electrode, and a change in capacitance at this intersection may indicate a user input. In some examples, there may be multiple intersections formed between multiple sense electrodes and the transmit electrode. In some cases, each of the intersections may align with an independent virtual button of the input region.

In the illustrated example, four intersections 1012, 1014, 1016, 1018 between sense electrodes 1020, 1022, 1024, 1026 and the transmit electrode 1010 are depicted on the transverse substrate 1004. Each of the intersections are aligned with virtual buttons 1030,1032, 1034, 1036. While the current example depicts four intersections corresponding to four virtual buttons, any suitable number of intersections and/or virtual buttons may be used in accordance with the principles described herein. Further, in some cases, more than one intersection may be aligned with the same virtual button. Further, in other examples, a single intersection may correspond to multiple virtual buttons.

In some examples, at least one sense electrode and the transmit electrodes are disposed on the same surface of the transverse substrate. In other examples, at least one sense electrode is disposed on first surface of the transverse substrate and the transmit electrode is disposed on a second surface of the transverse substrate where the second surface of the transverse substrate is opposite the first surface of the transverse substrate.

Figure 11:
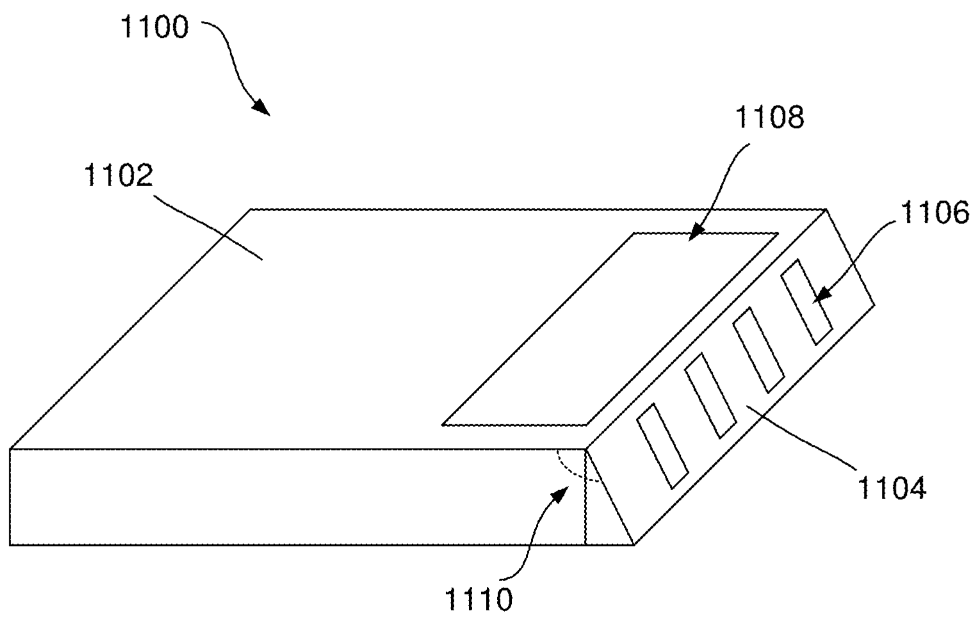
FIG. 11 depicts an example of an electronic device in accordance with the disclosure.

FIG. 11 depicts an example of an electronic device 1100 in accordance with the disclosure. The electronic device 1100 includes a display surface 1102, a transverse substrate 1104, sense electrodes 1106 disposed on the transverse substrate, an input region 1108 defined on the display surface, and intersection angle 1110 formed by the intersection of the two surfaces. In this example, the intersection angle 1110 exceeds 90 degrees where the transverse substrate 1104 is angled outward relative to the display surface 1102.

Positioning the transverse substrate 1104 at an obtuse angle may improve ergonomics and reduce false activations in handheld devices. Because the electrodes face slightly away from the user, incidental contact with a finger resting on the device edge may be less likely to couple strongly to the fields, while intentional touches on the input region 1108 remain within the configured sensing range. This embodiment may simplify mechanical integration where an internal component, such as a battery or hinge, occupies space directly under the display surface 1102.

Figure 12:
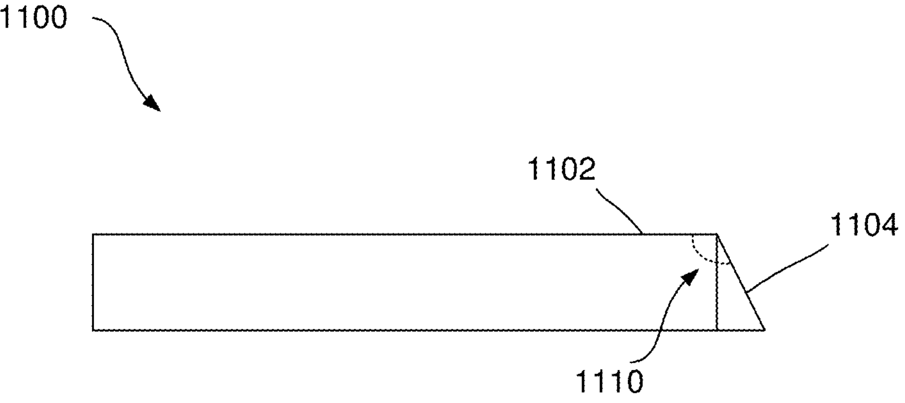
FIG. 12 depicts an example of an electronic device in accordance with the disclosure.

For illustrative purposes, FIG. 12 depicts a cross-sectional view of the electronic device 1100, showing the intersection angle 1110 between the display surface 1102 and the transverse substrate 1104. The length and depth of the input region of the sense electrodes 1106 may be affected by the position of the sense electrodes on such an inclined surface. In some cases, the sense electrode may be positioned on a portion of the inclined transverse substrate that is closer to the input region. For example, in embodiments where the transverse substrate slopes away from the intersection angle, the area of the transverse substrate that is proximate to the transverse substrate may be closer to the input region as the proximate area may not be spatially located outwardly as far away as the distal area of the transverse substrate.

In some embodiments, the intersection angle 1110 between the display surface 1102 and the transverse substrate 1104 may range between 95 degrees to about 125 degrees. Angles at the lower end of this range may provide a larger sensing depth into the display surface 1102, while steeper angles may provide a smaller active input region, which may be useful for implementing narrow, bezel-adjacent gesture strips or virtual buttons without encroaching on the main visual area of the display surface.

Figure 13:
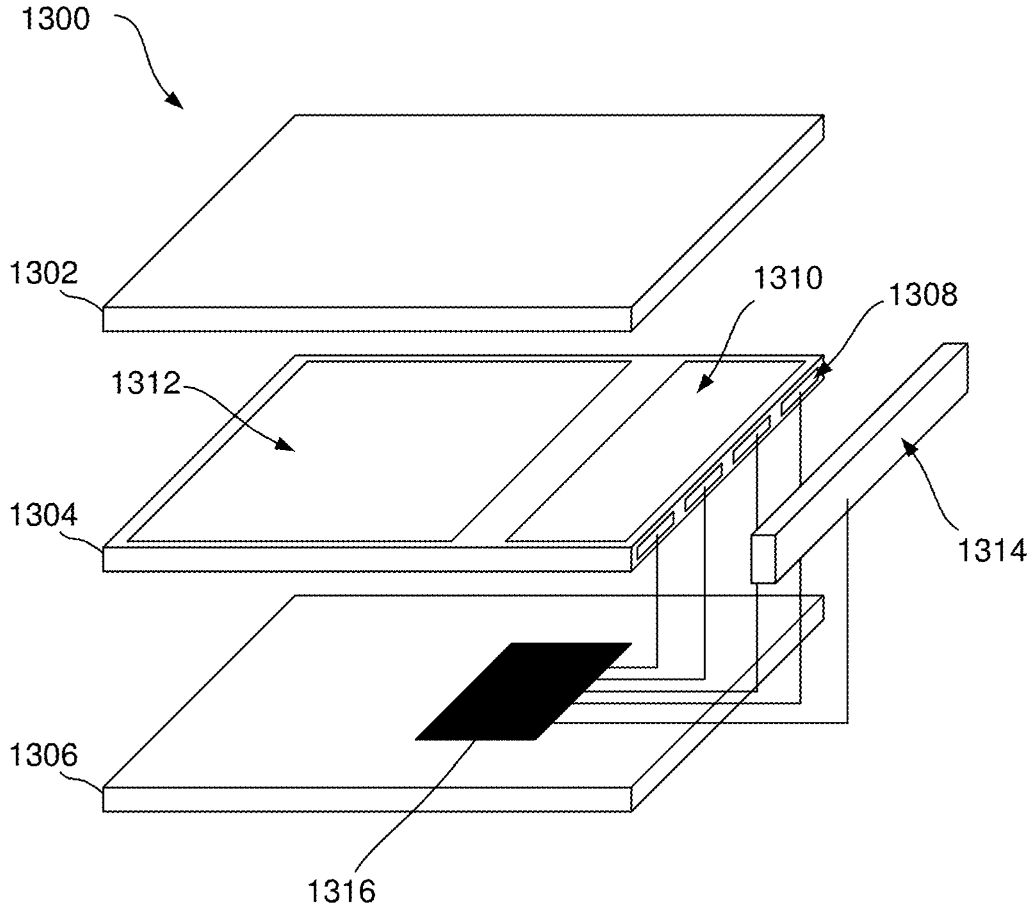
FIG. 13 depicts an example of a capacitance module in accordance with the disclosure.

FIG. 13 depicts an example of a capacitance module 1300, in accordance with the disclosure. In this example, the capacitance module 1300 is a stack of layers including a capacitance reference surface 1302, a display layer 1304 adjacent to the reference surface, and a component layer 1306 adjacent to the display layer. While three layers are depicted in this example, in other embodiments, a capacitance module may include more or less layers.

The capacitance reference surface 1302 may be made of a material that is transparent to electric fields. A user may interact with the capacitance module 1300 by bringing an input object near or touching the capacitance reference surface 1302.

The display layer 1304 includes a display module 1312 and an input region 1310 on one surface, and sense electrodes 1308 disposed on a transverse substrate. The display module 1312 may be a liquid crystal display (LCD), an organic light emitting diode (OLED) display, an e-paper display, another type of display, or combinations thereof.

The sense electrodes 1308 may be used to detect user input corresponding to the input region 1310. As a user interacts with the capacitance module 1300 by touching or approaching the capacitance reference surface 1302 overlapping the input region 1310, the sense electrodes 1308 may exhibit a change in their capacitance as measured by a processor 1316 disposed on the component layer 1306. When the processor 1308 detects a capacitance change from the sense electrodes, it may identify a user input corresponding to that change. In response to identified user input, the processor 1316 may adjust the output of the display module 1312 or the input region 1310 in embodiments where an input region is a display module.

A non-electrode shield 1314 is disposed adjacent the sense electrodes 1308. The non-electrode shield 1314 is connected to the processor 1316 and may shield the sense electrodes 1308 from electromagnetic interference while also confining their sensing range to the input region 1310, preventing accidental inputs on the capacitance module 1300.

The illustrated example depicts electrodes disposed on the side of a display layer may be used to detect user input, even though the electrodes are not located immediately subjacent to the input region.

Figure 14:
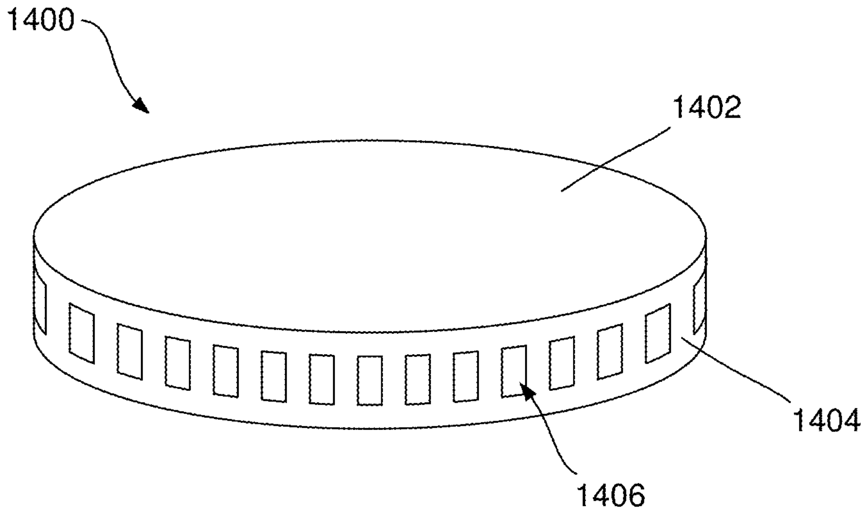
FIG. 14 depicts an example of an electronic device in accordance with the disclosure.

FIG. 14 depicts an example of an electronic device 1400 in accordance with the disclosure. In this example, the electronic device 1400 has a circular disc shape, with a circular display surface 1402 and a transverse substrate 1404 which defines the periphery of the electronic device. Sense electrodes 1406 may be disposed on the transverse substrate 1404.

The sense electrodes 1406 may be used in a self-capacitance sensing mode to detect user input on the display surface 1402. In other examples, electrodes on a transverse substrate may include a transmit electrode, and the electrodes may form a mutual capacitance sensor.

Figure 15:
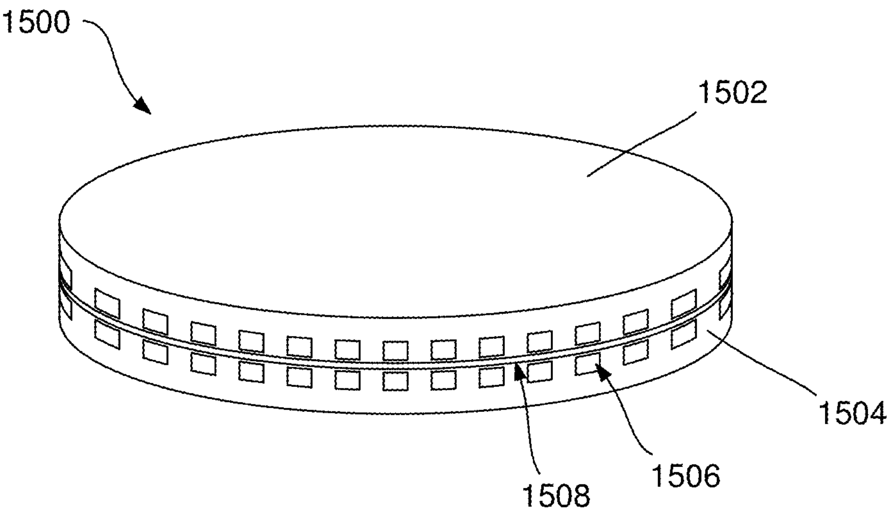
FIG. 15 depicts an example of an electronic device in accordance with the disclosure.

FIG. 15 depicts an example of an electronic device 1500 in accordance with the disclosure. In this example, the electronic device 1500 has a circular display surface 1502, a circumferential transverse substrate 1504, sense electrodes 1506 disposed on the transverse substrate, and a transmit electrode 1508 disposed on the transverse substrate. The transmit electrode 1508 is positioned between sense electrodes 1506 on either side, and the electrodes form a mutual capacitance sensor. The mutual capacitance sensor formed by the sense electrodes 1506 and the transmit electrode 1508 may be used to detect user input on the display surface.

Electronic devices with circular display surfaces, such as the devices depicted in FIGS. 14-15, may be incorporated into wearable applications such as smartwatches. Circular shapes may also be useful in other applications, including but not limited to home appliances, industrial controls, automotive interfaces, and spatially constrained enclosures.

Figure 16:
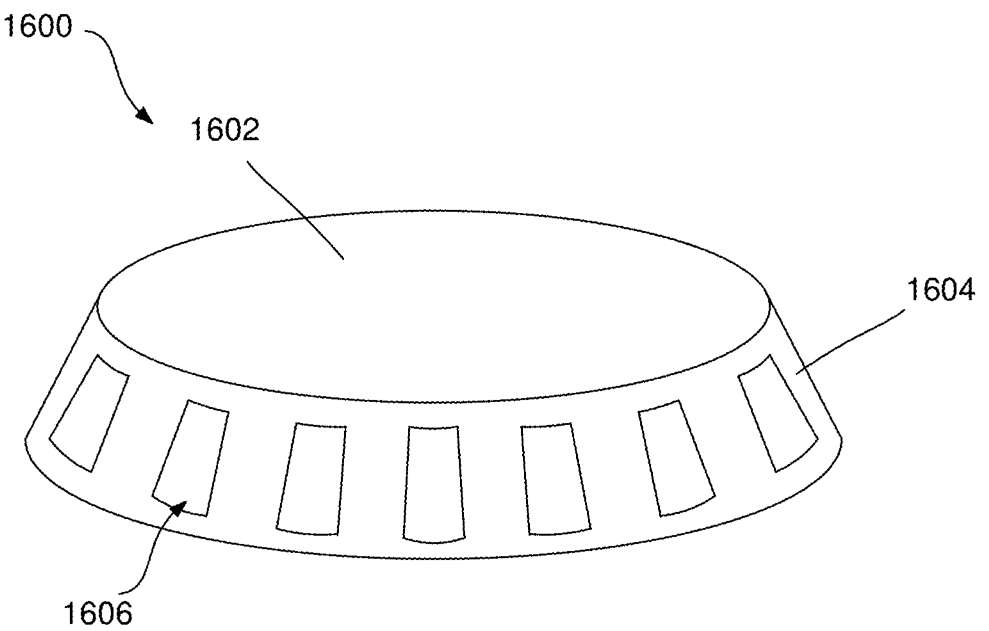
FIG. 16 depicts an example of an electronic device in accordance with the disclosure.

FIG. 16 depicts an example of an electronic device 1600 in accordance with the disclosure. In this example, the device 1600 has a circular display surface 1602 with a peripheral transverse substrate 1604 which joins the display surface at an intersection angle. Sense electrodes 1606 are disposed on the transverse substrate 1604, providing capacitive sensing input on the display surface 1602.

Figure 17:
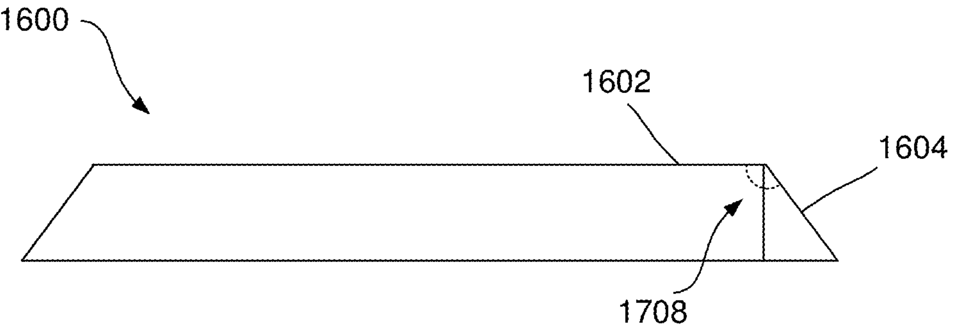
FIG. 17 depicts an example of an electronic device in accordance with the disclosure.

FIG. 17 depicts a cross-section view of the electronic device 1600. This example illustrates an internal angle 1708 between the display surface 1602 and the transverse substrate 1604. The value of the internal angle 1708 may be selected to optimize the coupling of the electric fields into the display surface 1602 while minimizing interference from ambient or off-axis objects.

The oblique orientation of the transverse substrate 1604 relative to the display surface 1602 may serve multiple functional purposes. It may facilitate radial coupling of the electric fields into the display surface 1602, improving sensing uniformity along the perimeter. It may also allow for improved device ergonomics. By avoiding a perpendicular layout of electrodes, the parasitic capacitive coupling between the sense electrodes 1606 and nearby surfaces may be reduced.

As with other embodiments, a non-electrode shield (not shown) may surround the electrodes 1606 to constrain the sensing volume and suppress electromagnetic interference. The shield may be floating, grounded, or actively driven with a voltage distinctly different from the electrode transmit voltage to shape the capacitance field profile and improve signal to noise ratio or from the sense voltage.

The embodiments depicted in FIGS. 14-17 demonstrate that the side-electrode architecture is not limited to planar or rectangular interfaces, but may be extended to support curved, angled, or circular geometries, broadening the applicability of capacitive input systems in electronic devices.

Figure 18:
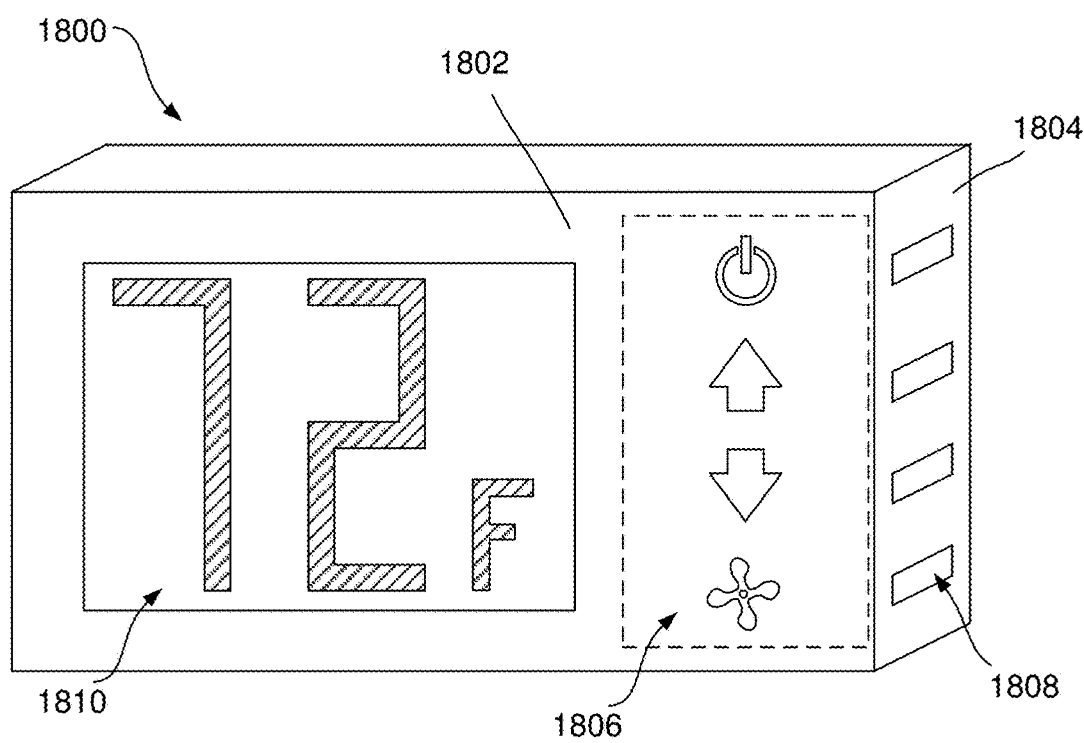
FIG. 18 depicts an example of an electronic device in accordance with the disclosure.

FIG. 18 depicts an example of an electronic device 1800 in accordance with the disclosure. In this example, the electronic device 1800 is a thermostat, with a temperature display 1810 and virtual button controls 1806 located on a display surface 1802. Sense electrodes 1808 are disposed on a transverse substrate 1804 which is transversely oriented with respect to the display surface 1802. These sense electrodes 1808 may be configured to detect capacitive input within the input region where virtual buttons 1806 are located. This embodiment may enable user interaction without using mechanical switches or direct-touch overlays above or below the display area.

Figure 19:
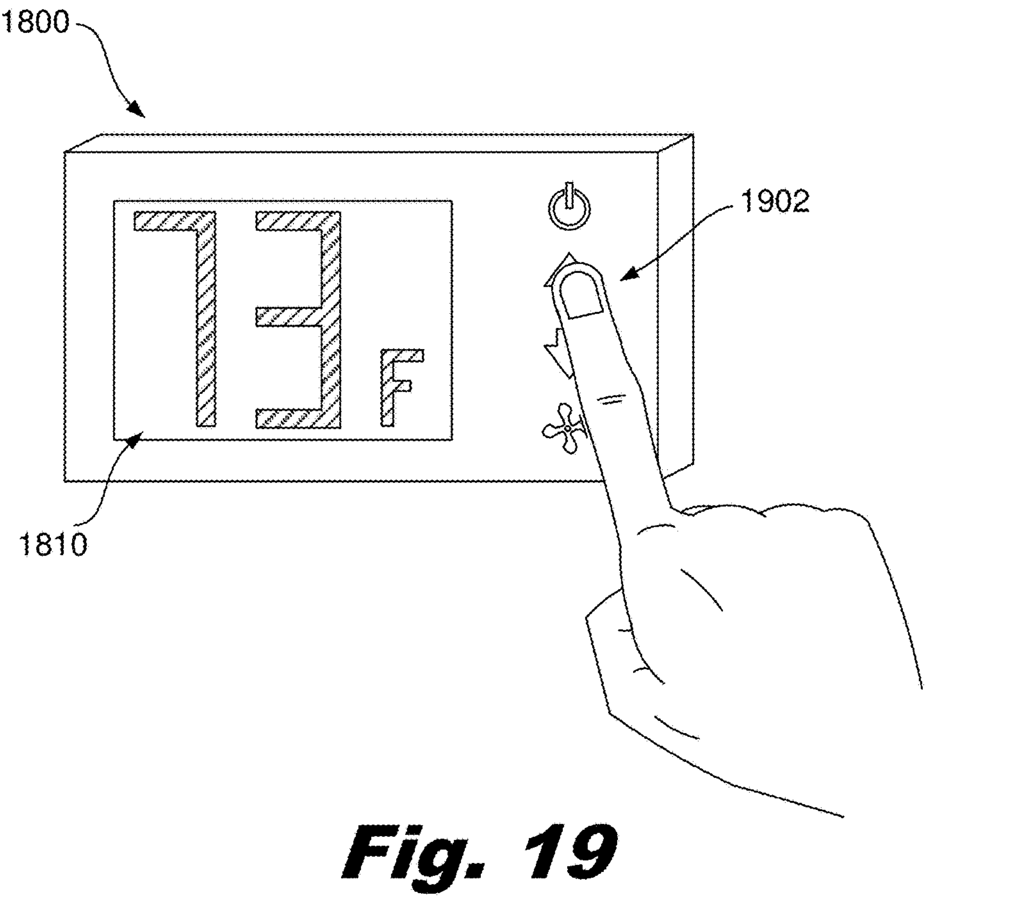
FIG. 19 depicts an example of a user input in accordance with the disclosure.

FIG. 19 illustrates the device 1800 during a user interaction. A user input 1902 is shown contacting one of the virtual button controls 1806. In response, the thermostat system detects a change in capacitance via the sense electrodes 1808, interprets the input, and updates the temperature display 1810 accordingly. For example, in this illustration, the temperature has increased from 72 degrees to 73 degrees based on the user's input.

The illustrated example depicts side-mounted capacitance electrodes supports intuitive, button-style interfaces while maintaining a clean and uninterrupted display surface. The button controls 1806 may be dynamically rendered graphics or printed decals, and may be rearranged, replaced, or animated based on the system state. In some examples, the input region may correspond one-to-one with the underlying sense electrodes 1808. In other examples, the system may rely on signal interpolation when a greater number of visual controls are present than electrodes.

While the electrodes in this example form multiple self-capacitance sensors, other examples may incorporate mutual capacitance implementations, allowing for more precise input detection and expanded gesture support.

By locating sensing electrodes to a side-mounted, non-display facing surface, manufacturing may be simplified, the display surface may have improved high-contrast visual output, and other advantages.

FIGS. 20A and 20B depict examples of an electronic device 2000 in accordance with the disclosure. In this example, the device 2000 has a circular display surface 2002 joined to a surrounding transverse substrate 2004. The circular display surface 2002 includes a display 2006, that presents a volume indicator along with a graphical arc representing volume level. Sense electrodes 2008 are disposed along the curved transverse substrate 2004 and are configured to detect capacitive input along the perimeter of the display surface 2002. In this embodiment, the electrodes 2008 are configured as self-capacitance sensors or mutual capacitance sensors.

FIG. 21 illustrates the device 2000 during use. A user input 2102 is shown as a finger tracing along the edge of the circular display surface 2002, initiating a swipe gesture. As the user's finger moves across adjacent electrode sensing regions, changes in capacitance of the sense electrodes 20089 are detected and interpreted as a directional gesture. In this case, the detected swipe is used to increase the volume, and the display 2006 updates to reflect the new setting.

The illustrated example depicts side-mounted capacitive electrodes may enable rotational gesture input around a circular display without involving a mechanical dial or an overlaying touch panel. The transverse substrate 2004 may be angled or rounded relative to the display surface 2002 to guide the user's finger naturally along the arc. Electrode count and spacing may be tuned to optimize swipe resolution or to support discrete tap-based interactions. In some embodiments, signal processing logic may interpolate touch positions or proximity positions based on differential changes in the self-capacitance of adjacent electrodes, allowing for continuous input along the circular path.

A non-electrode shield (not shown) may be included around the sense electrodes 2008 to localize the sensing range of the sense electrodes 2008 and to prevent electromagnetic interference.

This configuration may be suited to applications involving rotary input, such as volume controls, dimmers, menu navigation dials, or virtual scroll wheels.

FIG. 22 depicts an example of a method 2200 for using a capacitance module in an electronic device. This method 2200 may be performed based on the description of the devices, modules, and principles described in relation to FIGS. 1-21. The method 2200 may include determining 2002 a user input in the input region on a display surface in response to a signal from the capacitance electrode located on a surface transverse the display surface.

FIG. 23 depicts an example of a method 2300 for using a capacitance module in an electronic device. This method 2300 may be performed based on the description of the devices, modules, and principles described in relation to FIGS. 1-22. The method 2300 may include determining 2302 a user input in a first virtual button of the input region when a change in capacitance at a first intersection between a transmit electrode and a first sense is detected on a surface transverse the display surface determining 2304 a user input in a second virtual button of the input region when the change in capacitance at a second intersection between the transmit electrode and a second sense is detected on the surface transverse the display surface It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An electronic device, comprising:

a display surface;

the display surface having an input region that is located proximate an edge of the display surface;

a transverse substrate that is transversely oriented with respect to the display surface;

a capacitance electrode disposed on the transverse substrate;

wherein the capacitance electrode is disposed between a non-electrode shield and the display surface;

wherein the non-electrode shield overlaps the capacitance electrode and shields against sensing input on the transverse substrate;

a controller connected to the capacitance electrode;

memory in communication with the controller, the memory comprising programmed instructions which cause the controller, when executed to:

determine a user input in the input region in response to a signal from the capacitance electrode.

2. The electronic device of claim 1, wherein the display surface is free of capacitance electrodes.

3. The electronic device of claim 1, wherein the capacitance electrode is a sense electrode.

4. The electronic device of claim 3, further comprising a transmit electrode between the non-electrode shield and the display surface.

5. The electronic device of claim 4, wherein the transmit electrode and the sense electrode form a mutual capacitance sensing circuit.

6. The electronic device of claim 4, wherein the programmed instructions cause the transmit electrode to transmit a signal having a different voltage from the voltage of the non-electrode shield.

7. The electronic device of claim 4, wherein the sense electrode has a sensing range that extends from the non-electrode shield into a portion of the display surface.

8. The electronic device of claim 7, wherein the sensing range extends to under a third of the length of the display surface.

9. The electronic device of claim 1, wherein the non-electrode shield is electrically isolated from the controller.

10. The electronic device of claim 1, wherein the programmed instructions further cause the processor, when executed, to adjust a value displayed in the display surface in response to determining a user input in the input region.

11. The electronic device of claim 1, further including a display module adjacent to the display surface.

12. The electronic device of claim 11, wherein the display module includes at least one pixel, and the capacitance electrode is between the at least one pixel and the non-electrode shield.

13. The electronic device of claim 11, wherein the display module overlaps at least a portion of the input region.

14. The electronic device of claim 11, wherein the display module and the input region are spatially distinct.

15. The electronic device of claim 1, wherein the non-electrode shield is grounded.

16. The electronic device of claim 1, wherein the non-electrode shield is a floating element.

17. The electronic device of claim 1, wherein the display surface has a rectangular shape.

18. The electronic device of claim 1, wherein the display surface has a circular shape.

19. An electronic device, comprising:

a display surface;

the display surface having an input region that is located proximate an edge of the display surface;

a transverse substrate that is transversely oriented with respect to the display surface;

a transmit electrode and a first sense electrode disposed on the transverse substrate where the transmit electrode and the first sense electrode form a first intersection;

a second sense electrode disposed on the transverse substrate where the transmit electrode and the second sense electrode form a second intersection;

wherein the transmit electrode, the first sense electrode, and the second sense electrode are disposed between a non-electrode shield and the display surface;

the non-electrode shield overlaps the capacitance electrode and shields against sensing input on the transverse substrate;

a controller connected to the capacitance transmit electrode, the first sense electrode, and the second sense electrode;

memory in communication with the controller, the memory comprising programmed instructions which cause the controller, when executed to:

determine a user input in a first virtual button of the input region when a change in capacitance at the first intersection is detected; and determine the user input in a second virtual button of the input region when a change in capacitance at the second intersection is detected.

20. An electronic device, comprising:

a display surface;

the display surface having an input region that is located proximate an edge of the display surface;

a transverse substrate that is transversely oriented with respect to the display surface;

a capacitance electrode disposed on the transverse substrate;

wherein the capacitance electrode is disposed between a non-electrode shield and the display surface;

wherein the non-electrode shield is grounded or is a floating element;

a controller connected to the capacitance electrode;

memory in communication with the controller, the memory comprising programmed instructions which cause the controller, when executed to:

determine a user input in the input region in response to a signal from the capacitance electrode.

* * * * *